Aug. 17, 1943.    J. DELMONTE    2,327,098
LUBRICATED BEARING FOR MOTORS AND THE LIKE
Original Filed Oct. 13, 1939
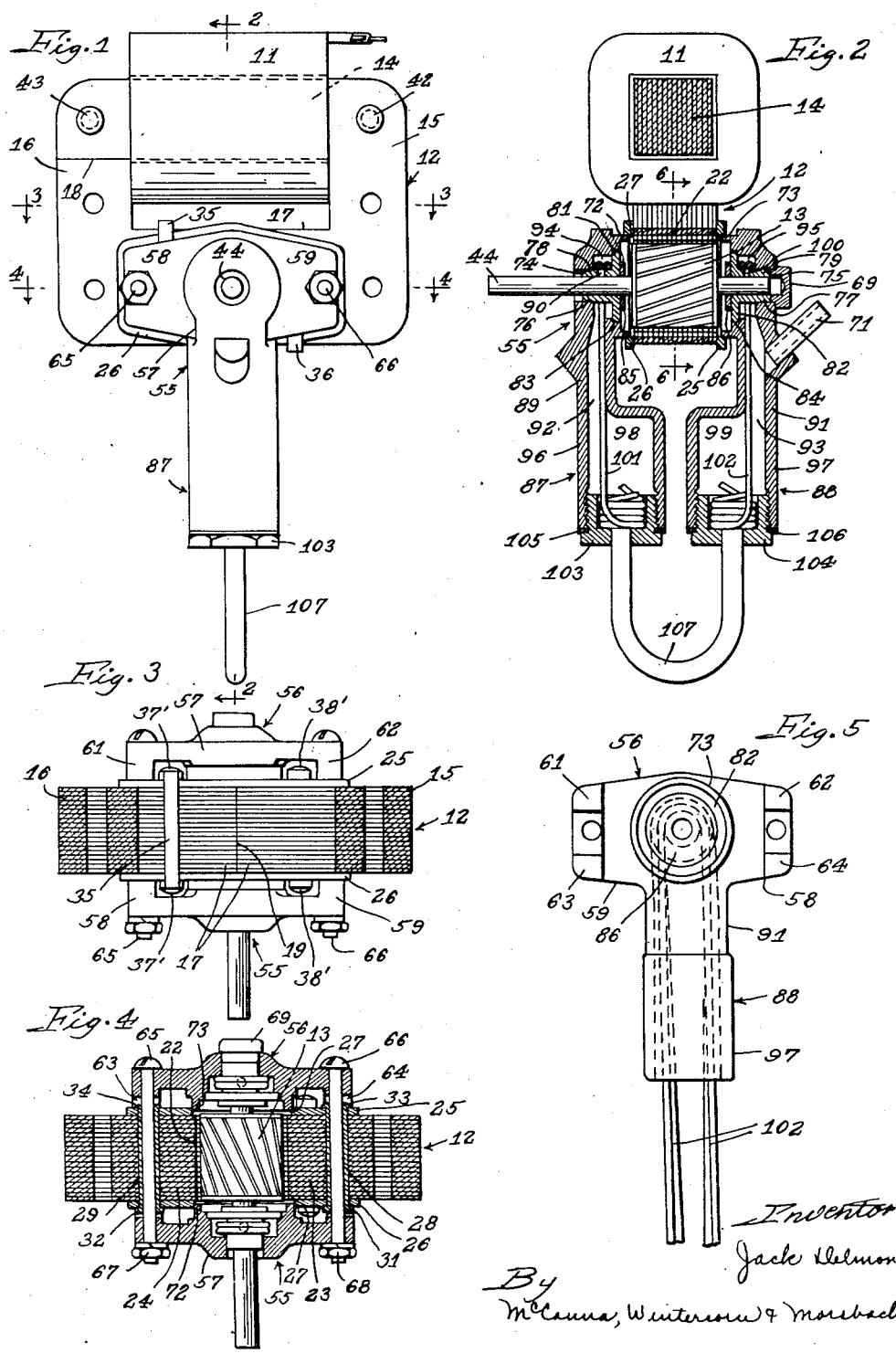
Inventor:
Jack Delmonte
By
McCanna, Winterrowd & Morsbach
Attys.

Patented Aug. 17, 1943

2,327,098

UNITED STATES PATENT OFFICE

2,327,098

LUBRICATED BEARING FOR MOTORS AND THE LIKE

Jack Delmonte, Glendale, Calif., assignor to Chicago Flexible Shaft Company, Chicago, Ill., a corporation of Illinois Original application October 13, 1939, Serial No. 299,246, now Patent No. 2,245,433, dated June 10, 1941. Divided and this application June 7, 1941, Serial No. 397,064

8 Claims. (Cl. 308—132)

This invention relates to lubricating bearings for electric motors and the like and is a division of my application Serial No. 299,246, filed October 13, 1939, now Patent No. 2,245,433.

A primary object of the present invention is the provision of improved means for lubricating the rotor bearings of an electric motor.

Another object is to provide an improved bearing structure together with improved lubrication means therefor characterized by plural bearing assemblies each constituting a bearing unit having an oil reservoir and capillary means for supplying oil from the reservoir to the bearing, together with means connecting the oil reservoirs so that they are supplied with oil from a single source, the structure providing a closed system adapted to function for a comparatively long period without refilling.

Another object is to provide an improved bearing structure and lubrication means therefor particularly adapted for application where precision in location and alignment of a horizontal shaft and coacting parts is concerned.

Another object is to provide an improved bearing and lubricating means of the character described constructed so as to permit of manufacture at a comparatively low cost.

Other objects and advantages will appear from the following description and the accompanying drawing, in which—

Fig. 1 is a side view of an electric motor embodying my invention;

Fig. 2 is a section on the line 2—2 of Fig. 1;

Fig. 3 is a section on the line 3—3 of Fig. 1;

Fig. 4 is a section on the line 4—4 of Fig. 1; and

Fig. 5 is a side elevation of one of the bearing assembly units.

My invention is particularly adapted for small electric motors such as are used for household electric appliances, although adapted for other applications where plural bearings for a horizontal shaft are used as above indicated. The drawing shows an embodiment, designed for an electric fan or a fan heater. The motor herein disclosed is of the induction type having a squirrel-cage armature and short circuited armature conductors, a rotating magnetic field being produced in the conventional manner through the use of shaded poles. The motor includes structure which functions to facilitate the aligning of the rotor and the rotor bearings, as claimed in the above mentioned application.

Directing attention now to the drawing, the numeral 11 designates generally the main motor winding, the numeral 12 the field laminations, and the numeral 13 the rotor of the motor. The field coil is of the usual construction and serves to receive one side 14 of the field laminations 12, the latter of which are in the form of a rectangle having the side 14, ends 15 and 16 and a side 17 which latter side forms the poles of the motor in accordance with the usual practice. Each of the laminations is made up of two pieces, one of the pieces including the side 14, one end, and half of the side 17, whereas the other piece includes half of the side 17 and the other of the ends, the pieces abutting as shown at 18 in Fig. 1 and 19 in Fig. 3. The laminations are alternated in the usual way so that each succeeding lamination overlies the abutting line 18 so as to produce a rigid core with parting lines therethrough at 19. The side 17 of the core has a rotor opening 22 cylindrical in shape and slightly larger than the rotor, the opening being placed midway between the ends of the side 17 and forming pole pieces 23 and 24. Secured to opposite faces of the core are locating plates 25 and 26, which plates are each provided with a circular opening 27 which is concentric with the rotor opening 22, and in this instance of slightly larger diameter. These plates are secured against the opposite faces of the core by means of hollow rivets 28 and 29 having pre-formed heads 31 and 32 and heads 33 and 34 splayed over in the riveting process. These rivets 28 and 29 serve to hold the locating plates 25 and 26 in parallel relationship, and also with the openings 27 in concentric relationship with the rotor opening 22 after said plates and the laminations have been aligned by reason of the special alignment features of the assembly fixture as disclosed in the above mentioned application. These rivets also serve to hold the laminations tightly together with the abutting ends along the parting lines 19 into firm abutting relationship. Positioned on the side 17 adjacent opposite sides thereof are shading rings 35 and 36 in the form of copper straps extending along the faces of the portion 17 and across the edge thereof, the ends of the straps being interconnected, these shading coils performing the well known function of delaying the magnetic flux by setting up an opposing field due to currents induced in the shading coil, as is well known in the art. The laminations in the core are also held together by means of rivets 42 and 43.

The rotor 13 is supported in the rotor opening 22 by means of bearing assembly units designated generally by the numerals 55 and 56 adapted to receive the rotor shaft 44 at opposite sides of the rotor laminations. These bearing assembly units in this instance each include a plate-like bearing bracket 57 (Fig. 1) having laterally projecting ears 58 and 59 and upper feet 61 and 62 and lower feet 63 and 64 (Fig. 5), adapted to seat against the locating plates 25 and 26. Intermediate the feet are bolts 65 and 66 which pass through the brackets 57 and through the tubular rivets 28 and 29 as shown in Fig. 4, the ends of the bolts having nuts 67 and 68 for tightening the bearing brackets against the locating plates. The bearing assembly units are identical in construction with the exception that the unit 56 has a cap 69 covering the end of the shaft 44 and a tube 71 for supplying lubricant to the lubricant reservoirs, as will presently be described. Each of the brackets 57 also has a cylindrical boss as shown at 72 and 73, these bosses being received within the openings 27 of the locating plates, and being shaped for reception therein within very close tolerances whereby to locate the bearing brackets with respect to the rotor opening 22. The bearing brackets are provided with openings 74 and 75 adapted to receive the hub portions 76 and 77 of bearing elements 78 and 79 (Fig. 2), which elements are formed of so-called oilless bearing metal and have circular flanges 81 and 82 receivable in recesses 83 and 84 within the bosses 72 and 73, the bearing brackets and complemental parts being shaped to fit within close tolerances so as to accurately locate the bearing elements. The bearing elements 78 and 79 are provided with holes 90 and 100 for the purpose of transmitting lubricant to the interface between the shaft 44 and the bearing elements. Positioned on the shaft 44 between the laminations and the bearing elements 78 and 79 are washers 85 and 86, in this instance of micarta or similar reinforced synthetic resin.

Integral with the brackets 57 of the bearing assembly units 55 and 56 are lubricant reservoirs designated generally by the numerals 87 and 88, these reservoirs including flat tubular portions 89 and 91 connected with the brackets 57 and having central passages 92 and 93 communicating with chambers 94 and 95, which chambers surround the hub portions 78 and 79 of the bearing elements. The portions 89 and 91 have tubular reservoir portions 96 and 97 at their bottom ends provided with chambers 98 and 99 communicating with the central passages 92 and 93. Positioned within the chambers 98 and 99, the passages 92 and 93, and the chambers 94 and 95, are woolen cords 101 and 102 which are given several turns about the bearing elements 78 and 79, the ends of the cords depending through the passages 92 and 93 and into the chambers 98 and 99 and being of such length as to normally depend beyond the latter chambers, as shown in Fig. 5. The terminal ends of the cords are stuffed back into each chamber 98 and 99 during the process of assembly. The lower ends of the chambers 98 and 99 are closed by means of screw plugs 103 and 104 which engage threads in the bottom ends of the cylindrical portions 96 and 97 and are sealed by means of lead washers 105 and 106 or otherwise, as may be convenient. The plugs 103 and 104 are provided with central openings into which are seated the ends of a U-shaped tube 107, the tube being sweat or soldered into the plugs to provide a fluid-tight connection. The tube 107 permits of lubricant communication between the chambers 98 and 99. The bearing assembly unit 56 has a tube 71 secured in the side thereof, the interior of which communicates with the passage 93 and the chamber 99, the tube serving to supply lubricant to this chamber. It will be seen that through this means the chambers 98 and 99, together with the tube 107, can be substantially filled with lubricant which will be transmitted up to the bearing elements 78 and 79 by the cords 101 and 102 which serve as wicks to elevate the lubricant in a capillary action. Obviously, the lubricant is a relatively thin oil which will be readily moved by capillary action.

As described more fully in the above mentioned application, it is possible without tedious adjustment or extreme care on the part of the operator to make the rotor opening cylindrical within a relatively high degree of accuracy and to maintain the same dimensions of the rotor opening. It is likewise possible to bring the openings 27 of the locating plates into substantially true concentricity with the rotor opening. As a result it is necessary in making the remainder of the motor to merely turn the rotor laminations to true concentricity with the shaft 44, which, of course, is easily done by the usual machining methods, and, likewise, to finish the bosses 72 and 73 by turning operations coaxial with the bearing openings of the respective bearing brackets in order to assure perfect alignment of the bearings when the bearing brackets are seated against the locating plates. It will be observed that the end surfaces of the feet 61, 62, 63 and 64 of each bearing bracket are accurately finished in a common plane perpendicular to the axis of the annular locating boss of such bracket so that when these end surfaces rest against the adjacent locating plate they lie in a plane exactly perpendicular to the bearing axis. The bearings, it will be seen, are brought into coaxial relationship because of the precision in locating the preliminary bearing bracket bosses in the locating plates and because of the feet 61, 62, 63 and 64 bearing directly against the faces of the locating plates, which, during the assembling operations, are brought into parallel relationship. It will be further observed that in locating and setting the respective bearing units to obtain the precision relation between the shaft-carried part (the rotor 13 in this instance) and the part in coaction therewith (the rotor opening 22 or pole faces), relative movement between the bearing units is permitted by reason of the inherent flexibility of the connecting tube 107. When mounting the bearing units on the locating plates there is no need for attention on the part of the workman either as to the spacing between respective bearing units or the matter of obtaining nicety of alignment of the bearings and precision in location of the rotor in the field opening. Instead, when the bearing brackets of these units are applied to the locating plates and clamped in position the respective bearings are automatically brought into the desired precision alignment. This precision in location and alignment of the bearing units is obtained regardless of variations even of a substantial degree in the ultimate spacing between the bearing units. Thus, even though in actual production manufacture the laminations may vary in thickness so that the accumulated variation approximates the thickness of a single lamination, the bearing assembly will accommodate and conform with such variation. It will also be observed that relative movement or displacement of one bearing unit with respect to the other due to expansion and contraction from changes in temperature in operation are permitted by reason of flexibility in the tube 107 without affecting the sealed connections at the ends of the tube. In the preferred embodiment of my invention the motor field constitutes the primary supporting structure and, as shown in Figs. 1, 3 and 4, the ends 15 and 16 of the laminations are provided with openings adapted to receive fastening bolts or the like for mounting the motor. It follows that in this application of my invention the bearing units are mounted on the supporting structure and the rotor is in turn mounted on the bearing units.

It will be further observed that with this construction I am able to provide, with simple production methods, a uniform and accurately controlled air gap between the armature and the poles. This construction entirely obviates the usual tedious procedure of adjustment and approximation heretofore required in aligning the bearings and in adjusting the air gap between the rotor and the poles of the field magnet. In the past the usual technique has been to allow relatively liberal tolerances and to tap the bearing brackets until quiet operation is obtained. With the structure herein disclosed, relatively small tolerance allowances are made and the parts readily fit into the desired alignment and coaxial relationship.

Attention is directed to the fact that the oil reservoir for each bearing unit is formed integral with the bearing bracket which directly supports each bearing, and that a U-shaped tube joins the two reservoirs, thereby permitting oil to be fed from a single opening outside the motor, which eliminates the necessity for oiling at both bearings. Furthermore, these oil reservoirs are located below the level of the bearing, and the oil is fed to the bearing by capillary action. The structure provides a closed system of lubrication with oil reservoirs of substantial size. This permits a large supply of oil to be carried in the reservoirs sufficient to lubricate the motor for prolonged periods of operation. The structure is also particularly well adapted for locating and supporting a shaft by plural bearing units in precision relation between a shaft-carrying part and a coacting part, together with communicating lubrication reservoirs connected so as to permit of relative movement between the bearing units to accommodate the locating and alignment function of said units.

It will be understood that the present showing is by way of illustration and not limitation, and I do not, therefore, desire to be limited except as required by the prior art and the scope of the appended claims, in which—

I claim:

1. A lubricated bearing structure for a shaft adapted for application to a supporting structure, said bearing structure comprising a combined bearing and lubrication assembly unit for application to each side of the supporting structure and a flexible tube connecting the units, each unit comprising a bearing for the shaft, a bracket in which the bearing is mounted, the bracket being shaped for attachment to the supporting structure in precision relation thereto, the bracket having a chamber around its bearing and a depending lubricant reservoir communicating with said chamber, a wick in the reservoir extending into said chamber and arranged for supplying lubricant to the shaft bearing by capillary action, said tube connecting the lower end of one reservoir to the lower end of the other and permitting through its flexibility relative displacement of one unit with respect to the other.

2. A lubricated bearing structure for a shaft adapted for application to a supporting structure, said bearing structure comprising a combined bearing and lubrication assembly unit and a flexible tube connecting the units, each unit comprising a bearing for the shaft, a bracket in which the bearing is mounted, means operative between the bracket and the supporting structure for connecting the bracket in position with its bearing in predetermined precision relation to said supporting structure, the bracket having a depending lubricant reservoir and means for supplying lubricant from the reservoir to its bearing, said tube connecting the lower end of one reservoir to the lower end of the other and permitting through its flexibility relative displacement of one unit with respect to the other.

3. In combination, a supporting structure having a through opening and locating means at each end of said opening, a rotary shaft extending through said opening and beyond said locating means and carrying a part adapted for coaction with the supporting structure, a combined bearing and lubrication assembly unit for application to the locating means at each end of said opening, each unit comprising a bearing in which the adjacent end of the shaft is journalled, a bracket in which the bearing is mounted, the bracket being shaped for attachment to the adjacent locating means to locate the shaft and its said part in predetermined relation with respect to the supporting structure, the bracket having integral therewith a depending lubricant reservoir of substantial capacity, a wick in the reservoir arranged to supply lubricant to the shaft bearing by capillary action, a flexible U-shaped tube connecting the lower ends of the lubricant reservoirs and providing lubricant communication therebetween, and means fixedly securing the bracket of each unit to the supporting structure in said located relation thereto, each unit being capable of relative displacement with respect to the other by reason of flexibility of said tube while maintaining the lubricant sealed communication between the reservoirs of said units.

4. The combination set forth in claim 3, in which each bearing is of sleeve form and has an annular flange at one end, and each bracket has a bore to receive one end of the bearing sleeve, an annular seat at its inner side to receive the annular flange of its bearing, and a chamber around the bearing sleeve intermediate said bore and said annular seat, and the wick in each bearing unit extends through said chamber.

5. The combination set forth in claim 3, in which each bracket is formed to provide a cylindrical boss concentric with its bearing and adapted to fit a complemental cylindrical opening which comprises a part of the locating means, and laterally projecting ears having locating feet adapted to seat against the adjacent locating means.

6. The combination set forth in claim 3, in which the wick in each boring unit extends from its lubricant reservoir around its bearing and back to said reservoir.

7. The combination set forth in claim 3, in which the lubricant reservoir of each bearing unit is cylindrical and has a closure plug threaded into its lower end, and the ends of the U-shaped tube are sealed in said closure plugs.

8. The combination set forth in claim 3, in which one of the bearing units is provided with a lubricant supply tube communicating with its lubricant reservoir and located above said reservoir and extending upwardly to position its inlet end substantially level with the bearing.

JACK DELMONTE.